United States Patent
Walter et al.

(10) Patent No.: US 12,411,069 B2
(45) Date of Patent: Sep. 9, 2025

(54) METHOD FOR DETERMINING THE SIZE OF PARTICLES

(71) Applicant: UNISERS LTD, Zurich (CH)

(72) Inventors: Fabian Walter, Zurich (CH); Ali Özhan Altun, Zurich (CH); Timo Stefan Schneider, Zurich (CH)

(73) Assignee: UNISERS LTD, Zurich (CH)

( * ) Notice: Subject to any disclaimer, the term of this patent is extended or adjusted under 35 U.S.C. 154(b) by 214 days.

(21) Appl. No.: 18/261,404

(22) PCT Filed: Dec. 13, 2021

(86) PCT No.: PCT/IB2021/061656
§ 371 (c)(1),
(2) Date: Jul. 13, 2023

(87) PCT Pub. No.: WO2022/153111
PCT Pub. Date: Jul. 21, 2022

(65) Prior Publication Data
US 2024/0077400 A1 Mar. 7, 2024

(30) Foreign Application Priority Data

Jan. 14, 2021 (CH) .......................................... 31/21

(51) Int. Cl.
*G01N 15/0227* (2024.01)
(52) U.S. Cl.
CPC ................ *G01N 15/0227* (2013.01)
(58) Field of Classification Search
CPC ........... G01N 15/0227; G01N 15/0625; G01N 1/2813; G01N 15/0612; G01N 15/0205
See application file for complete search history.

(56) References Cited

U.S. PATENT DOCUMENTS

2022/0214263 A1    7/2022  Walter

FOREIGN PATENT DOCUMENTS

| JP | 2012088222 A | 5/2012 |
| JP | 2018151273 A | 9/2019 |
| TW | 202041845 A | 11/2020 |

(Continued)

OTHER PUBLICATIONS

International Search Report issued in Application No. PCT/IB2021/061484 dated Feb. 23, 2022.

(Continued)

*Primary Examiner* — Rebecca C Bryant
(74) *Attorney, Agent, or Firm* — McDonald Hopkins LLC

(57) ABSTRACT

Method including providing a substrate having a non-metallic surface with particles on the surface; depositing a layer of metal on the surface and the particles, so that each particle and an area of the surface without particles has a layer of metal, wherein, each particle has a gap between metal on that particle and metal on the surface; illuminating metal with electromagnetic rays, so that rays are scattered by metal on particles to produce scattered rays; or rays are absorbed by metal on particles and another portion of rays are reflected by metal on the surface to produce reflected rays; receiving scattered or reflected rays at an array of photodiodes; forming an image as pixels corresponding to photodiodes, wherein the colour of each pixel corresponds to the intensity and/or frequency of the rays received at that pixel; processing the image to determine the size of the particles.

17 Claims, 1 Drawing Sheet

(56) References Cited

FOREIGN PATENT DOCUMENTS

WO 2020229876 A1 11/2020

OTHER PUBLICATIONS

Masao Gen et al: "Electrospray surface-enhanced Raman spectroscopy (ES-SERS) for probing surface chemical compositions of atmospherically relevant particles", Atmospheric Chemistry and Physics, Nov. 24, 2017, pp. 14025-14037, vol. 17, No. 22, XP055658319.

(a) providing a substrate which has a non-metallic surface having particles on said non-metallic surface

(b) depositing a layer of metal on the non-metallic surface of the substrate and said particles which are on said non-metallic surface of the substrate, so that each of said particles is provided with a respective single layer of metal and an area of the said non-metallic surface which is without particles is provided with a layer of metal, wherein, for each particle there is a gap between the layer of metal on that particle and the layer of metal on said non-metallic surface

(c) illuminating said layers of metal on said particles and said layer of metal on said non-metallic surface of the substrate with electromagnetic rays, so that said electromagnetic rays are scattered by the layers of metal on said particles to produce respectively scattered electromagnetic rays; or illuminating said layers of metal on said particles and said layer of metal on said non-metallic surface of the substrate, so that at least a portion of said electromagnetic rays are absorbed by layers of metal on said particles and another portion of said electromagnetic rays are reflected by said layer of metal on said non-metallic surface of the substrate to produce reflected electromagnetic rays

(d) receiving the scattered electromagnetic rays at an array of photodiodes; or receiving the said reflected electromagnetic rays at an array of photodiodes

(e) forming an image which comprises pixels, wherein each pixel in the image corresponds to a respective photodiode in said array, wherein the colour of each pixel in said image corresponds to the intensity or/and frequency of the electromagnetic rays which photodiode corresponding to that pixel received

(f) processing said formed image to determine the size of the particles

METHOD FOR DETERMINING THE SIZE OF PARTICLES

FIELD OF THE INVENTION

The present invention concerns a method for determining the size of particles; and in particular, a method for determining the size of particles on a non-metallic surface (such as silicon wafers), which involves providing a metal layer on the particles and non-metallic surface; illuminating said metallic layers on particles and metallic surface of the substrate with electromagnetic rays; forming an image using the scattered electromagnetic rays or reflected electromagnetic rays; and processing said image to determine the size of the particles.

DESCRIPTION OF RELATED ART

Existing techniques for determining the size of particles have proven inadequate. Existing techniques involve providing a metallic surface on a substrate, and then providing the particles on said metallic surface; next a metallic layer is provided on the particles and on the metallic surface of the substrate; the metallic layers on particles and substrate are illuminated with electromagnetic rays and an image is formed using the scattered electromagnetic rays or reflected electromagnetic rays; the image is then processed to determine the size of the particles.

Disadvantageously in these existing techniques in order to determine the size of the particles, the substrate must be provided with a metallic surface and the particles must then be provided on the metallic surface of the substrate (i.e. these existing techniques only work when the particles are provided on a metallic surface).

The existing techniques would not work if they were adapted to provide the metallic layer on the particles which are a non-metallic surface as this would result in a discontinuous metallic layer; gaps in the metallic layer would result in noise in the image, making the accurate determination of the size of the particles impossible.

Furthermore increasing the thickness of the metallic layer to ensure that that metallic layer is more continuous (less number of gaps) would result in many of the smaller sized particles (i.e. particles which have a size smaller than the thickness of the metallic layer) becoming completely buried within the metallic layer; particles which are completely buried within the metallic layer will not scatter electromagnetic rays or reflected electromagnetic rays and thus will not appear in the image. In other words, disadvantageously, only the sizes of very large sized particles could be determined.

It is an aim of the present invention to mitigate or obviate the disadvantages associated with said existing techniques.

BRIEF SUMMARY OF THE INVENTION

According to the invention, these aims are achieved by means of a method having the steps recited in the independent claim 1 of the present application; wherein the dependent claims recite optional features of preferred embodiments.

Advantageously, in the method of the present invention the size of the particles which are on a non-metallic surface is determined. This is particularly useful to determine the size of particles on the surface of substrates such as silicon wafers.

BRIEF DESCRIPTION OF THE DRAWINGS

The invention will be better understood with the aid of the description of an embodiment given by way of example and illustrated by the figures, in which:

FIG. 1 shows a flow diagram of the steps taken in when performing a method according to present invention

DETAILED DESCRIPTION OF POSSIBLE EMBODIMENTS OF THE INVENTION

According to the present invention there is provided a method for determining the size of particles, the method comprising the steps of, (a) providing a substrate which has a non-metallic surface having particles on said non-metallic surface;

(b) depositing a layer of metal on the non-metallic surface of the substrate and said particles which are on said non-metallic surface of the substrate, so that each of said particles is provided with a respective single layer of metal and an area of the said non-metallic surface which is without particles is provided with a layer of metal, wherein, for each particle there is a gap between the layer of metal on that particle and the layer of metal on said non-metallic surface;

(c) illuminating said layers of metal on said particles and said layer of metal on said non-metallic surface of the substrate with electromagnetic rays, so that said electromagnetic rays are scattered by the layers of metal on said particles to produce respectively scattered electromagnetic rays; or illuminating said layers of metal on said particles and said layer of metal on said non-metallic surface of the substrate, so that at least a portion of said electromagnetic rays are absorbed by layers of metal on said particles and another portion of said electromagnetic rays are reflected by said layer of metal on said non-metallic surface of the substrate to produce reflected electromagnetic rays;

(d) receiving the scattered electromagnetic rays at an array of photodiodes; or receiving the said reflected electromagnetic rays at an array of photodiodes;

(e) forming an image which comprises pixels, wherein each pixel in the image corresponds to a respective photodiode in said array, wherein the colour of each pixel in said image corresponds to the intensity and/or frequency of the electromagnetic rays which photodiode corresponding to that pixel received;

(f) processing said formed image to determine the size of the particles.

For example, in one embodiment the formed image is a black-and-white image; in this embodiment the 'colour' of a pixel in the formed image is defined by the 'intensity' of the electromagnetic rays which the photodiode corresponding to that pixel received (the intensity of a pixel will be directly proportion to the number of photons which were incident on the photodiode corresponding to that pixel). In another embodiment the formed image is a coloured image; in this embodiment the 'colour' of a pixel in the formed image is defined by the 'frequency' and 'intensity' of the electromagnetic rays which the photodiode corresponding to that pixel received (for example 'red' colour pixel will mean that the electromagnetic rays which the photodiode corresponding to that pixel received had a frequency in the range 430-480 THz and the 'intensity' of the 'red' colour pixel will be proportional to the number of photos which are within the frequency in the range 430-480 THz which the photodiode corresponding to that pixel received; an 'orange' colour pixel will mean that the electromagnetic rays which the photodiode corresponding to that pixel received had a frequency in the frequency in the rang 480-510 THz and the 'intensity' of the 'orange' colour pixel will be proportional to the number of photos which are within the frequency in the range 480-510 THz which the photodiode corresponding to that pixel received; a 'yellow' colour pixel will mean that the electromagnetic rays which the photodiode corresponding to that pixel received had a frequency in the range 510-540 THz and the 'intensity' of the 'yellow' colour pixel will be proportional to the number of photos which are within the frequency in the range 510-540 THz which the photodiode corresponding to that pixel received; a 'green' colour pixel will mean that the electromagnetic rays which the photodiode corresponding to that pixel received had a frequency in the range 540-580 THz and the 'intensity' of the 'green' colour pixel will be proportional to the number of photos which are within the frequency in the range 540-580 THz which the photodiode corresponding to that pixel received.

For example, the colour of a pixel in the formed image may be represented numerically as the number of photons which the photodiode corresponding to that pixel received if only one frequency band is in the scattered electromagnetic rays (image can be represented as a 2-dimensional matrix). In another example the colour of a pixel in the formed image may be represented numerically as the number of photons which the photodiode corresponding to that pixel received together with the respective frequency band if multiple frequency bands are in the scattered electromagnetic rays (image can be represented by a 3-d matrix). In another example colour of a pixel in the formed image can be simplified to brightness if only there is only one single frequency band in the scattered electromagnetic rays or if the scattered electromagnetic rays have different frequency bands which are combined into one single frequency band (e.g. by summing up the different intensities of the different frequency bands).

In the preferred embodiment the method comprises the steps of,
(a) providing a substrate which has a non-metallic surface having particles on said non-metallic surface;
(b) depositing a layer of metal on the non-metallic surface of the substrate and said particles which are on said non-metallic surface of the substrate, so that each of said particles is provided with a respective single layer of metal and an area of the said non-metallic surface which is without particles is provided with a layer of metal, wherein, for each particle there is a gap between the layer of metal on that particle and the layer of metal on said non-metallic surface;
(c) illuminating said layers of metal on said particles and said layer of metal on said non-metallic surface of the substrate with electromagnetic rays, so that said electromagnetic rays are scattered by layers of metal on said particles to produce respectively scattered electromagnetic rays;
(d) receiving the scattered electromagnetic rays at an array of photodiodes;
(e) forming a dark field image which comprises pixels, wherein each pixel in the image corresponds to a respective photodiode in said array, wherein the colour of each pixel in said image corresponds to the intensity and/or frequency of the scattered light which photodiode corresponding to that pixel received;
(f) processing said dark field image to determine the size of the particles.

Step (a)

Step (a) comprises providing a substrate which has a non-metallic surface having particles on said non-metallic surface.

Step (a) preferably comprises providing a substrate which has a non-metallic surface, wherein the non-metallic surface preferably comprises at least one or more of, silicon, $SiO_2$ (glass), quartz, gallium arsenide, $Si_3N_4$, $TiO_2$, $HfO_2$, ZnSe, ZnS, $ZrO_2$, $Nb_2O_5$, $LaTiO_3$, $To_2O_5$, LiF, $MgF_2$, $Na_3AlF_6$, a photoresist, a corrosion inhibitor layer or an adhesion promoter layer.

Examples of a photoresist include, but are not limited to polyhydroxystyrene (PHS), acrylic polymer, and phenolic resins; examples of a corrosion inhibitor include, but are not limited to benzotriazole; examples of an adhesion promoter layer include, but are not limited to Hexamethyldisilazane (HMDS). It should be understood that in the present invention the non-metallic surface is not limited to requiring at least one or more of, silicon, $SiO_2$ (glass), quartz, gallium arsenide, $Si_3N_4$, $TiO_2$, $HfO_2$, ZnSe, ZnS, $ZrO_2$, $Nb_2O_5$, $LaTiO_3$, $To_2O_5$, LiF, $MgF_2$, $Na_3AlF_6$, a photoresist, a corrosion inhibitor layer or an adhesion promoter layer, rather the non-metallic surface may comprise any other suitable non-metallic material/compounds.

The non-metallic surface preferably has a roughness which is less than 100 Angstroms. Most preferably the non-metallic surface has a roughness which is less than 50 Angstroms. Any suitable known means for measuring roughness could be used to determine the roughness of the non-metallic surface; for example the roughness measurement could be the root mean square measured by an Atomic force microscope measured over a certain distance.

Step (b)

Step (b) comprises depositing a layer of metal on the non-metallic surface of the substrate and said particles which are on said non-metallic surface of the substrate, so that each of said particles is provided with a respective single layer of metal and an area of the said non-metallic surface which is without particles is provided with a layer of metal, wherein, for each particle there is a gap between the layer of metal on that particle and the layer of metal on said non-metallic surface.

It should be understood that step (b) is not limited to requiring depositing a layer of metal on the whole of the non-metallic surface of the substrate and/or on all of said particles which are on said whole of the non-metallic surface of the substrate; rather, in an alternative embodiment a layer or metal is deposited on only a selected portion of the non-metallic surface of the substrate and only on the particles which are on said selected portion of the non-metallic surface of the substrate. For example, the selected portion could be a strip across the non-metallic surface.

In the preferred embodiment said deposited a layer of metal on the non-metallic surface of the substrate and on said particles which are on said non-metallic surface of the substrate, comprises grains of a plurality of different sizes. In other words the deposited layer of metal is multigrain. Most preferably the average size of all the grains in the deposited layer of metal is in the range 10 nm-100 nm. Some grains in the deposited layer of metal may have sizes which are larger than 100 nm and some grains in the deposited layer of metal may have sizes which are smaller than 10 nm, however the average size of all of the grains which are in the deposited layer of metal is preferable somewhere in the range 10 nm-100 nm. In one embodiment at least 85% of the grains in the deposited a layer of metal have a size in the range 10 nm-100 nm.

In an embodiment the average size of all the grains in the deposited layer of metal is in the range 10 nm-70 nm. In an embodiment the average size of all the grains in the deposited layer of metal is in the range 10 nm-35 nm.

The average grain size can be influenced by any one or more of the following aspects: the deposition rate of the layer of metal; the temperature of the substrate as the layer of metal is being deposited. In one embodiment the temperature of the substrate as the layer of metal is being deposited may be between −100° C.-80° C. In one embodiment the temperature of the substrate as the layer of metal is being deposited may be between 0° C.-40° C. In one embodiment the temperature of the substrate as the layer of metal is being deposited may be 20° C. In one embodiment the temperature of the substrate is controlled by controlling the temperature of the chuck (the chuck is a component which holds the substrate as the layer of metal is being deposited); the temperature of the chuck may be controlled using method known in the art such as via solid-state (thermoelectric) heating/cooling; or fluid assisted heating/cooling. Preferably closed loop control is used to maintain the temperature of the substrate (or to maintain the temperature of the chuck, and thereby indirectly maintain the temperature of the substrate) within a predefined temperature range.

It should be understood that in the present application the 'size' of a particle may defined by any measurable dimension (including, but not limited to, for example, diameter, length, width, height etc). In the most preferred embodiment each the particles are assumed to have a spherical shape and the 'size' is defined by a 'diameter' i.e. the diameter of the spherical-shaped particle. While some of the particles whose size is measured may not be spherical-shaped, the size measurement nonetheless which is obtained in the present invention for non-spherical-shaped particles is preferably a diameter of a corresponding spherical-shaped particle which would provide the equivalent level of scattered electromagnetic rays when illuminated.

In the preferred embodiment each of the respective layers of metal deposited on said particles, is continuous or substantially continuous; in other words, the layer provided on each respective particle is without gaps or voids or is substantially without gaps or voids. For example, in one embodiment the layer provided on each respective particle is without voids greater than a predefined size (e.g. is without voids having a diameter greater than 10 nm). This ensures that each respective particle has a single mass of metal layer. Preferably there is a gap between the single mass of metal layer on each respective particle and the metal layer provided on the non-metallic surface of the substrate; this allowing the almost isolated single mass of metal layer on each respective particles to form an oscillating electric dipole upon excitation with a light source; the gaps will advantageously serve to provide amplified optical scattering and/or amplified optical absorption.

The layer of metal deposited on the non-metallic surface of the substrate and the layer of metal deposited on said particles, comprises at least one of: W, Co, Ag, Au, Al, Cu. In an embodiment the layer of metal deposited on the non-metallic surface of the substrate and the layer of metal deposited on said particles, comprises an alloy which comprises at least 75% by weight percent of at least one of the following metals: W, Co, Ag, Au, Al, Cu. In another embodiment the layer of metal deposited on the non-metallic surface of the substrate and the layer of metal deposited on said particles, comprises an alloy which comprises at least 90% by weight percent of least one of: Ag, Au, Al.

The layer of metal deposited on the non-metallic surface of the substrate and the layer of metal deposited on said particles, may alternatively comprise, at least one of: Au, Ag, Al, Cu, Co, W, Ir, Pt, Pd, Ti, Fe, Cr, Sb, Ce, Dy, Er, Eu, Gd, Ge, Hf, In, Lu, Mg, Mn, Mo, Ni, Nb, Re, Ru, Ta, Zn, Y, V, Sn, Tm and/or alloys with no more than 10% of any other suitable metal.

In one embodiment the method further comprises defining a minimum size of particles whose size is to be determined; and the thickness of the layer of metal deposited on the non-metallic surface of the substrate and the thickness of the layer of metal deposited on said particles, is larger than said defined minimum size.

In one embodiment the non-metallic surface of the substrate is inorganic, and the thickness of the layer of metal deposited on the non-metallic surface of the substrate and the thickness of the layer of metal deposited on said particles, is in the range 10 nm-150 nm. Preferably the thickness of the layer of metal deposited on the non-metallic inorganic surface of the substrate and the thickness of the layer of metal deposited on said particles is in the range 20 nm-80 nm. More preferably the thickness of the layer of metal deposited on the non-metallic inorganic surface of the substrate and the thickness of the layer of metal deposited on said particles is in the range 40 nm-70 nm. Most preferably the thickness of the layer of metal deposited on the non-metallic inorganic surface of the substrate and the thickness of the layer of metal deposited on said particles is 50 nm.

In another embodiment the non-metallic surface of the substrate is organic, and the thickness of the layer of metal deposited on the non-metallic organic surface of the substrate and the thickness of the layer of metal deposited on said particles, is in the range 20 nm-160 nm. Preferably the thickness of the layer of metal deposited on the non-metallic organic surface of the substrate and the thickness of the layer of metal deposited on said particles is in the range 40 nm-100 nm. More preferably the thickness of the layer of metal deposited on the non-metallic organic surface of the substrate and the thickness of the layer of metal deposited on said particles is in the range 40 nm-70 nm. Most preferably the thickness of the layer of metal deposited on the non-metallic organic surface of the substrate and the thickness of the layer of metal deposited on said particles is 50 nm.

In an embodiment step (b) comprises depositing a layer of metal on the non-metallic surface of the substrate and a layer of metal on said particles, at a deposition rate in the range 0.2 Angstroms/second-50 Angstroms/second. Preferably the deposition rate in the range 0.8 Angstroms/second-5 Angstroms/second. Most preferably the deposition rate is 1.2 Angstroms/second.

For example, in the most preferred embodiment the non-metallic surface comprises silicon; the layer of metal deposited on the non-metallic surface of the substrate and the layer of metal deposited on said particles comprises silver (Ag); and the thickness of the layer of metal deposited on the non-metallic surface of the substrate and the thickness of the layer of metal deposited on said particles, is in the range 40 nm-70 nm (most preferably said thickness is 50 nm); and the step (b) comprises depositing the layer of metal on the non-metallic surface of the substrate and the layer of metal on said particles, at a deposition rate in the range 0.8 Angstroms/second-5 Angstroms/second (most preferably the deposition rate is 1.2 Angstroms/second)

Physical Vapor Deposition (PVD) is preferably used to deposit said layer of metal on the non-metallic surface of the substrate and deposit said layer of metal on said particles, so that each of said particles is provided with a respective layer of metal and an area of the said non-metallic surface which is without particles is provided with a layer of metal. Alternatively, pulsed laser deposition, e-beam evaporation or thermal evaporation could be used. In a preferred embodiment sputtering is used to deposit said layer of metal on the non-metallic surface of the substrate and said particles, so that each of said particles is provided with a respective layer of metal and an area of the said non-metallic surface which is without particles is provided with a layer of metal.

In an embodiment a sputtering (such as a magnetron sputtering) (sputtering is a type of Physical Vapor Deposition) is used to deposit said layer of metal on the non-metallic surface of the substrate and deposit said layer of metal on said particles so that each of said particles is provided with a respective layer of metal and an area of the said non-metallic surface which is without particles is provided with a layer of metal. In this embodiment in which sputtering is used, preferably the substrate is provided in a chamber. Before beginning PVD in the form of sputtering the pressure within the chamber is brought to a level which is lower than 7E-5 mbar (preferably is brought to a level which is lower than 5E-5 mbar; and most preferably is brought to a level which is lower than 3E-5 mbar). The chamber is then filled with an inert gas/noble gas to reach a predefined operation pressure. The inert gas/noble gas is preferably Argon (Ar). The pressure within the chamber is then brought to a pressure level in the range 1E-3 mbar-1E-1 mbar (preferably the pressure within the chamber is brought to a pressure level in the range 1E-2 mbar-8E-2 mbar; most preferably the pressure within the chamber is brought to a pressure level in the range 2E-2 mbar-7E-2 mbar). At this point sputtering may begin, wherein the metal is deposited onto the non-metallic surface of the substrate to form a layer of metal on the non-metallic surface of the substrate and a layer of metal on each of said respective particles. In this embodiment said metal is ejected from a target into the chamber and onto the non-metallic surface of the substrate.

Any suitable methods, known in the art, may be used to ensure that the layer of metal which is deposited on the non-metallic surface of the substrate and said layer of metals which is deposited on the respective particles, more uniform. For example, in order to make the layer of metal which is deposited on the non-metallic surface of the substrate and said layer of metals which is deposited on the respective particles, more uniform, the method may further comprise rotating the substrate as the layer of metal is being deposited; the substrate may be rotated around its centre of geometry or may be rotated around a point which is offset from its centre of geometry. The rotation axis may or may not align with the geometric centre of the target. Alternatively, or additionally, a plurality of metal sources may be provided each source supplying metal to be deposited during the PVD process. Alternatively, or additionally, magnetic field modulation could be used for sputtering. Alternatively, or additionally, the substrate could be orientated so that it is offset from a parallel orientation during the PVD process.

Steps (c)-(e)

Step (c) comprises, illuminating said layers of metal on said particles and said layer of metal on said non-metallic surface of the substrate with electromagnetic rays, so that said electromagnetic rays are scattered by the layers of metal on said particles to produce respectively scattered electromagnetic rays; or illuminating said layers of metal on said particles and said layer of metal on said non-metallic surface of the substrate, so that at least a portion of said electromagnetic rays are absorbed by layers of metal on said particles and another portion of said electromagnetic rays are reflected by said layer of metal on said non-metallic surface of the substrate to produce reflected electromagnetic rays. In the most preferred embodiment step (c) comprises illuminating said layers of metal on said particles and said layer of metal on said non-metallic surface of the substrate with electromagnetic rays, so that said electromagnetic rays are scattered by layers of metal on said particles to produce respectively scattered electromagnetic rays.

In the preferred embodiment the metal layer is illuminated portion-wise until the whole of the metal layer (including metal layer on all of said particles) has been illuminated. However, it should be understood that step (c) is not limited to requiring illuminating the whole a layer of metal on the whole of the non-metallic surface of the substrate and/or the metal layer on all of said particles which are on said whole of the non-metallic surface of the substrate; rather, in an alternative embodiment only a portion of the whole metal layer on the non-metallic surface is illuminated and only a portion of the metal layer on the particles is illuminated; in such an embodiment the metal layer is illuminated portion-wise but only a selected part (or a plurality of selected parts) of the whole metal layer is illuminated.

Step (d) comprises, receiving the scattered electromagnetic rays at an array of photodiodes; or receiving the said reflected electromagnetic rays at an array of photodiodes. In the most preferred embodiment step (d) comprises, receiving the scattered electromagnetic rays at an array of photodiodes.

Step (e) comprises, forming an image which comprises pixels, wherein each pixel in the image corresponds to a respective photodiode in said array, wherein the colour of each pixel in said image corresponds to the intensity and/or frequencies of the electromagnetic rays which photodiode corresponding to that pixel received. In the most preferred embodiment step (e) comprises forming a dark field image which comprises pixels, wherein each pixel in the image corresponds to a respective photodiode in said array, wherein the colour of each pixel in said image corresponds to the intensity and/or frequency of the scattered light which photodiode corresponding to that pixel received.

In one embodiment the formed image is a black-and-white image; in this embodiment the 'colour' of a pixel in the formed image is defined by the 'intensity' of the electromagnetic rays which the photodiode corresponding to that pixel received (the intensity of a pixel will be directly proportion to the number of photos which were incident on the photodiode corresponding to that pixel). In another embodiment the formed image is a coloured image; in this embodiment the 'colour' of a pixel in the formed image is defined by the 'frequency' of the electromagnetic rays which the photodiode corresponding to that pixel received (for example 'red' colour pixel will mean that the electromagnetic rays which the photodiode corresponding to that pixel received had a frequency in the range 430-480 THz; an 'orange' colour pixel will mean that the electromagnetic rays which the photodiode corresponding to that pixel received had a frequency in the frequency in the rang 480-510 THz; a 'yellow' colour pixel will mean that the electromagnetic rays which the photodiode corresponding to that pixel received had a frequency in the range 510-540 THz; a 'green' colour pixel will mean that the electromagnetic rays which the photodiode corresponding to that pixel received had a frequency in the range 540-580 THz.

In one embodiment the electromagnetic rays which are incident on the array of photodiodes have a wavelength in the range 120 nm-750 nm. In the most preferred embodiment, the electromagnetic rays which are incident on the array of photodiodes have a wavelength in the range 280 nm and 500 nm.

In one embodiment the scattered electromagnetic rays comprise Rayleigh scattered electromagnetic rays.

In one embodiment said layer of metal on said respective particles and the layer of metal on said non-metallic surface of the substrate, are illuminated with electromagnetic rays in a dark field set up, and at least a portion of said electromagnetic rays are scattered by the layer of metal on said respective particles to produce scattered electromagnetic rays (e.g. Rayleigh scattering). The scattered electromagnetic rays are received at an array of photodiodes and then a dark field image is formed which comprises pixels, wherein each pixel in the dark field image corresponds to a respective photodiode in said array. The colour of each pixel in said dark field image corresponds to the intensity and/or frequency of scattered electromagnetic rays which the photodiode corresponding to that pixel received. A photodiode which received a higher proportion of scattered electromagnetic rays will appear brighter than a pixel corresponding to a photodiode that received lesser proportion of scattered electromagnetic rays. In other words, each pixel in the dark field image has a colour which corresponds to the intensity and/or frequency of the scattered electromagnetic rays which the corresponding photodiode in the array received. Electromagnetic rays which have been scattered by said layer of metal on said respective particles create bright coloured pixels in the dark field image.

In said afore-mentioned embodiment which uses a dark field image, preferably the electromagnetic rays are incident on said the layer of metal on said respective particles and the layer of metal on said non-metallic surface of the substrate, at an angle which is offset to 90 degrees to a plane of the surface of the layer of metal on said non-metallic surface of the substrate. Preferably the electromagnetic rays are provided by an illuminating said layers of metal on said particles and metallic surface with a broadband illumination (for example with white light).

In each of the above-mentioned embodiments, preferably the said layer of metal on said respective particles and layer of metal on the non-metallic surface of the substrate, are illuminated with electromagnetic rays by illuminating said layers of metal on said particles and non-metallic surface with a broadband illumination (for example with white light).

In an embodiment, in order to capture the dark field image or bright field image, said layer of metal on said respective particles and said layer of metal on said non-metallic surface of the substrate, are illuminated with electromagnetic rays emitted from a plurality of different light sources; in other words the electromagnetic rays, which illuminate said layer of metal on said respective particles and said layer of metal on said non-metallic surface of the substrate, are provided by a plurality of different light sources. In an embodiment said plurality of different light sources comprises plurality of different light sources each with different bands of frequencies.

In an embodiment the method may further comprise a step of pixel binning which involves combining a plurality of pixels into one pixel. This step can be performed when using certain, predefined types of photodiodes in step (d), so as the reduce noise in the image which is formed in step (e).

Step (f)

Step (f) comprises, processing said formed image to determine the size of the particles. In the preferred embodiment step (f) the formed image is a dark field image, so step (f) comprises, processing said dark field image to determine the size of the particles.

It should be understood that in the present application the 'size' of a particle may defined by any measurable dimension (including, but not limited to, for example, diameter, length, width, height etc). In the most preferred embodiment each the particles are assumed to have a spherical shape and the 'size' is defined by a 'diameter' i.e. the diameter of the spherical-shaped particle. While some of the particles whose size is measured may not be spherical-shaped, the size measurement nonetheless which is obtained in the present invention for non-spherical-shaped particles is preferably a diameter of a corresponding spherical-shaped particle which would provide the equivalent level of scattered electromagnetic rays when illuminated; thus, in the preferred embodiment even if some of the particles whose size are measured are non-spherical-shaped the 'size' of these particles is still defined by a 'diameter'. Accordingly, in step (f) of the present invention, determining the 'size' of a particle preferably means determining a diameter of each particle.

In the preferred embodiment the formed image is first processed to reduce noise in the image, before carrying out step (f) of processing said formed image to determine the size of the particles. For example in order process the formed image to reduce noise, image smoothing or suitable noise filtering techniques, may be carried out on the image.

In an embodiment a step of removing the background in the formed image is carried out, before carrying out step (f) of processing said formed image to determine the size of the particles. In this embodiment first the background of the formed image is estimated using any suitable means; and then the estimated background is subtracted from the formed image. For example: the background of the formed image may be estimated by determining the median of the colour of all the pixels of the formed image, or the background of the formed image may be estimated by determining the median of colour of one or more clusters of pixels in the formed image (each cluster may have any suitable number of pixels—e.g. a cluster may be 1000 pixels). In another example the background of the formed image may have been previously determined in a calibration step which involves providing a substrate which has a non-metallic surface which is without any particles on said non-metallic surface; depositing a layer of metal on the non-metallic surface of the substrate; illuminating said layer of metal on said non-metallic surface of the substrate with electromagnetic rays; receiving any scattered electromagnetic rays at an array of photodiodes; forming an image which comprises pixels, wherein each pixel in the image corresponds to a respective photodiode in said array, wherein the colour of each pixel in said image corresponds to the intensity and/or frequency of the electromagnetic rays which photodiode corresponding to that pixel received; since the non-metallic surface was without any particles the formed image defines an estimate of the background. In another example the background of the formed image may be estimated by fitting a multidimension plane (2-dimensional for a monochromatic (black and white) image, 3d-dimensional for multichromatic (multiple frequency bands of electromagnetic rays) image) to the formed image, preferably, an optimization algorithm such as Constrained Least Squares with constrains on high derivatives is used. It should be noted that the derivatives is the change in the colour of a pixel, which therefore represents the changes in the number of photons from scattered rays which were incident on that the photodiode which corresponds to that pixel. It should be further noted that particles usually cause higher derivatives in the colour. Therefore, fitting a plan with sufficiently small derivatives and using this plan as the background is preserving the particles. Preferably, small derivatives mean derivatives smaller than half the derivative from the smallest particles, which should be detected. It should be noted that the derivative from the smallest particles, which should be detected, is preferably estimated by depositing such particles on an otherwise particle free non-metallic surface, depositing a layer of metal on the non-metallic surface of the substrate and on said particles; illuminating said layer of metal on said non-metallic surface of the substrate and the layer of metal on said particles, with electromagnetic rays; receiving any scattered electromagnetic rays at an array of photodiodes; forming an image which comprises pixels, wherein each pixel in the image corresponds to a respective photodiode in said array, wherein the colour of each pixel in said image corresponds to the intensity and/or frequency of the electromagnetic rays which photodiode corresponding to that pixel received and calculate the average derivative of the particles in said image.

The step of processing said formed image to determine the size of the particles, preferably comprises, (i) inputting the image to a predefined model; wherein the predefined model defines different combinations of predefined image characteristics and a predefined particle size being associated with each of the different combinations of predefined image characteristics; (ii) extracting characteristics from said image; and identifying a combination of predefined image characteristics which matches said extracted characteristics; and (iii) outputting the predefined particle size which are associated with said identified combinations of predefined image characteristics which matched said extracted characteristics, wherein the outputted predefined particle size corresponds to the size of a particle which is shown in the image.

For example, in one embodiment a colour threshold is defined; clusters of pixels in the image formed in step (e), wherein each pixel in the cluster has a colour which is above the colour threshold, are identified; for each cluster the number of pixels which make up that cluster is counted. A predefined calibration curve which relates the number of pixels to the size of the particle is provided (in other words the curve is a graph of the numbers of pixel to particle size); (it should be noted that this predefined calibration curve is preferable determined in a calibration steps in which images of particles of known size are captured to give rise to an image which has clusters of pixels wherein each pixel in the cluster has a colour which is above the colour threshold; the number of pixels in the cluster for each particle is recorded so that the calibration curve which relates the number of pixels to the size of the particle can be formed). The particle size on the calibration curve which is associated with said counted number of pixels correspond to the size of the particle which that cluster of pixels represents. In this way the size of each particle can be determined. The colour threshold may be selected based on a minimum sized particle whose size is to be determined. This embodiment is preferably used for large sized particles (typically a large sized particle is a particle which has a size (e.g. a diameter) larger than 50 nm; however, it should be understood that what constitutes a large sized particle is dependent on variable factors such as the illumination intensity, efficiency of optics, efficiency of photodiode, size of photodiode) since large particles lead to multiple pixels above threshold in the cluster (and potentially even saturated the photodiodes and therefore information might be lost); the number of pixels above threshold in the cluster is related to the particle size.

Large sized particles (e.g. particles sized larger than 50 nm) will scatter more electromagnetic rays; therefore the larger particles will result in brighter (colour represented of a higher photon count) pixels in the formed image. Small sized particles (e.g. typically a small sized particle is a particle which has a size (e.g. a diameter) smaller than 50 nm; however, it should be understood that what constitutes a small sized particle is dependent on variable factors such as the illumination intensity, efficiency of optics, efficiency of photodiode, size of photodiode) however will produce a low amount of scattering, and thus will result in a low amount of scattered electromagnetic rays which in turn results in just small number of pixels in the formed image having a colour which is above the colour threshold. Therefore, in an embodiment of the present invention, the colour of the pixels in the formed image are used to estimate the size of the particles. For example, in one embodiment there is provided a look-up table having as entries a particle size associated with a pixel colour; this look-up table may be determined in a calibration step wherein images of particles having a known size are formed and intensities of the pixels of those images recorded so that there are different pixel colour values associated with different respective particle sizes in the look-up table. An embodiment of the present invention may further include the steps of defining a minimum sized particle whose size is to be determined; retrieving from the predefined look-up table the pixel colour value which is associated with the particle size corresponding to the defined minimum sized particle; wherein the retried pixel colour value corresponds to the particle size.

A high background signal appearing on the formed image can look similar to particles in the image; thus is a source of noise which can compromise the results of the method; therefore, it is preferable to adapt the particle detection if it is expected to have high background signal in the image; as an example this can be done by increasing the threshold of the minimum sized particle to detect.

In one embodiment, said formed image is processed to estimate the background signal. Preferably the process comprises of, (i) inputting the image to a predefined model; wherein the predefined model defines different combinations of predefined image characteristics and a predefined background signal characteristics being associated with each of the different combinations of predefined image characteristics; (ii) extracting characteristics from said image; and identifying a combination of predefined image characteristics which matches said extracted characteristics; and (iii) outputting the background signal characteristics which are associated with said identified combinations of predefined image characteristics which matched said extracted characteristics, wherein the outputted background signal characteristics corresponds to the background signal characteristics which is shown in the image. Preferably, the characteristics, which are estimated to be caused by the background signal, are ignored in the detection and size estimation of particles.

For example, the median colour of the image is calculated and is used to estimate the background signal. An embodiment of the present invention may further include the steps of retrieving from the predefined look-up table the minimum sized particle whose size can be reliably detected which is associated with the estimated background signal.

Larger sized particles will scatter a larger amount of electromagnetic rays; this large amount of scattering may result in noise (potentially also called "interference patterns") in nearby pixels in the formed image, and this noise could be mistaken for another particle. Thus, in one embodiment the method further comprises defining a threshold particle size, wherein the threshold particle size defines a minimum size a particle must have in order to constitute a large sized particle; identifying a cluster of pixels in the formed image which represent a large sized particle; removing pixels in the formed image which are within a predefined threshold distance from said identified cluster.

In another embodiment, the derivative of the colour between adjacent pixels is used to determine if the pixel represent an image of a particle or is noise. For example if a pixel is identified as having a colour which is greatly above the colour threshold, but all of the pixels which are adjacent that identified pixel have a colour which is far below the colour threshold, then it can be assumed that the colour of said identified pixel is due to noise and not due to the presence of a particle (i.e is not due to electromagnetic rays scattered by a particle). Preferably if the difference between the colour of the identified pixel and the colour of the pixels which are adjacent the identified pixel exceeds a predefined threshold then it is assumed that the colour of said identified pixel is due to noise and not due to the presence of a particle. On the other hand if the difference between the colour of the identified pixel and the colour of the pixels which are adjacent the identified pixel is below the predefined threshold then it is assumed that said identified pixel and its surrounding adjacent pixels do represent a particle (i.e. are due to electromagnetic rays scattered by a particle), in which case the pixels which are adjacent the identified pixel are considered when determining the size of the particle. For example there is provided a predefined calibration curve which relates the colour of the pixels to the size of the particle; thus the intensities of the said identified pixel and its surrounding adjacent pixels are summed and the corresponding size of the particle is then determine from said predefined calibration curve which relates the colour of the pixels to the size of the particle. It should be noted that this predefined calibration curve is preferably determined in a calibration step in which images of particles of known size are captured, and for each particle the intensities of pixels which represent that respective particle in the image are summed so as to provide a calibration curve which relates the summed intensities of pixels to the size of the particle.

It should be understood that in one embodiment said image formed in step (e) is an image corresponding to only a part of the whole surface area of the substrate, so in this embodiment steps (i)-(iii) are repeated for each of a plurality of images until images for whole surface area of the substrate have been processed. For example in one embodiment the array of photodiodes are moved to different positions over the substrate as the layers of metal on said particles and said layer of metal on said non-metallic surface are illuminated, so that the array of photodiodes can receive electromagnetic rays that were scattered at different areas of the substrate, so that images of different areas of the substrate area captured; these steps are repeated until images covering the whole surface area of the substrate have been captured. In another embodiment said image formed in step (e) is a single image corresponding to the whole surface area of the substrate, and so steps (i)-(iii) only need to be carried out a single time for said single image.

In another embodiment the method further comprises the step of using the determined size of the particles to determine a distribution of the size of the particles. This can be done after the sizes of a plurality of particles have been determined. The distribution may then be represented as the number of particles which are within predefined size ranges (for example determining that there are 'X' number of particles within the predefined size range 8 nm and 12 nm, and 'Y' number of particles within the predefined size range 13 nm to 20 nm, etc).

In another embodiment the method further comprises using the image formed in step (e) to estimate the location of a particle on said non-metallic surface of the substrate. In this embodiment the relative location of the array of photodiodes with respect to the substrate, during the time the array of photodiodes is receiving the scattered electromagnetic rays, is known (e.g. by having array of photodiodes maintained at a predefined physical location when step 'd' is being performed). Knowing the relative location of the array of photodiodes with respect to the substrate, and knowing parameters of the array of photodiodes such as the focal length, one can determine the physical location on the substrate of a particle depicted in the formed image from the location of the pixels in the formed image which depict said particle. In another embodiment the method comprises identify pixels within the formed image which represent reference markers which have a known physical location on the substrate; using these pixels which represent reference markers as references the physical location on the substrate of particles depicted in the formed image can be determined from the location of the pixels in the formed image relative to the pixels which represent reference markers.

If the image formed in step (e) is used to estimate the location of a particle on said non-metallic surface of the substrate then the size distribution, over the surface of the substrate, may also be determined.

In one embodiment wherein the image formed in step (e) is used to estimate the location of a particle on said non-metallic surface, the method further comprises the steps of, moving a Raman laser source to above the location of a particle; illuminating the layer of metal at the location of the particle, with a Raman laser emitted by the Raman laser source, wherein said Raman laser is scattered by said layer of metal to produce scattered light, and wherein the scattered light comprises both Raman scattered light and also Rayleigh scattered light; receiving said scattered light at an objective lens; filtering out the Rayleigh scattered light from the from the received scattered light and passing only the Raman scattered light through said objective lens; using an optical dispersion grating to disperse the Raman scattered light into different frequencies; receiving the dispersed Raman scattered light into a linear photodiode having a plurality of pixels, wherein each pixel is associated with a predefined different light frequency; determining a photon count per pixel, wherein the photon count per pixel corresponds to a light intensity for certain frequency; plotting the acquired photon count per frequency to form a Raman spectra. The method may further comprise the step of using the Raman spectra to characterize the material of the particles. This characterization may be done using a reference spectral library. The reference spectral library may be established with previous experiments wherein it has been established reference spectra based on known particles coated on the surface.

According to a further aspect of the present invention there is provided an assembly, which is operable to execute any one of the afore mentioned method embodiments. The assembly comprises at least, a station comprising means for depositing a layer of metal on said non-metallic surface and said particles on said non-metallic surface of the substrate, so that each of said particles is provided with a respective metallic layer and an area of the said non-metallic surface which is without particles is provided with a metallic layer, wherein, for each particle there is a gap between the metallic layer on the particle and the metallic layer on said non-metallic surface; station comprising means for illuminating said layers of metal on said particles and metallic surface with electromagnetic rays, so that said electromagnetic rays are scattered by layers of metal on said particles to produce respectively scattered electromagnetic rays; or illuminating said layers of metal on said particles and non-metallic surface with electromagnetic rays, so that at least a portion of said electromagnetic rays are absorbed by layers of metal on said particles and another portion of said electromagnetic rays are reflected by the metallic layer provided on the non-metallic surface on the substrate to produce reflected electromagnetic rays; station comprising an array of photodiodes which can receive the scattered electromagnetic rays at an array of photodiodes; or which can receive said reflected electromagnetic rays; a station comprising means for forming an image which comprises pixels, wherein each pixel in the image corresponds to a respective photodiode in said array, wherein the colour of each pixel in said image corresponds to the intensity and/or frequency of the electromagnetic rays which photodiode corresponding to that pixel received; and a station comprising means for processing said formed image to determine the size of the particles Various modifications and variations to the described embodiments of the invention will be apparent to those skilled in the art without departing from the scope of the invention as defined in the appended claims. For example in one embodiment the method comprises: providing a substrate which has a non-metallic surface having particles on said non-metallic surface; in other words the particles are already on the non-metallic surface. This could be the case for example when a silicon wafer is provided, and the there are particles (or debris) on the surface of the wafer. In another embodiment a substrate having a clean non-metallic surface is provided and the particles are applied to the clean non-metallic surface; such an embodiment may include the steps of, bringing a fluid sample which contains particles, into contact with said non-metallic surface of the substrate; removing the fluid which was brought into contact with said non-metallic surface, from said non-metallic surface, so that only particles which were in said fluid sample remain on the non-metallic surface of the substrate, so as to provide said substrate which has a non-metallic surface having particles on said non-metallic surface. This embodiment may further comprise the step of spinning the substrate as said sample fluid is brought into contact with the non-metallic surface of the substrate. This embodiment may further comprise the step of evaporating the sample fluid from the non-metallic surface.

Although the invention has been described in connection with specific preferred embodiments, it should be understood that the invention as claimed should not be unduly limited to such specific embodiment.

The invention claimed is:

1. A method for determining the size of particles, the method comprising the steps of:
   (a) providing a substrate which has a non-metallic surface having particles on said non-metallic surface;
   (b) defining a minimum size of particles whose size is to be determined and depositing a layer of metal on the non-metallic surface of the substrate and said particles which are on said non-metallic surface of the substrate, so that each of said particles is provided with a respective single layer of metal and an area of the said non-metallic surface which is without particles is provided with a layer of metal,
   wherein, for each particle there is a gap between the layer of metal on that particle and the layer of metal on said non-metallic surface, and
   wherein the non-metallic surface of the substrate is inorganic and the thickness of the layer of metal deposited on the non-metallic inorganic surface of the substrate and the thickness of the layer of metal deposited on said particles is in the range of 20 nm-80 nm;
   (c) illuminating said layers of metal on said particles and said layer of metal on said non-metallic surface of the substrate with electromagnetic rays, so that said electromagnetic rays are scattered by the layers of metal on said particles to produce respectively scattered electromagnetic rays; or illuminating said layers of metal on said particles and said layer of metal on said non-metallic surface of the substrate, so that at least a portion of said electromagnetic rays are absorbed by layers of metal on said particles and another portion of said electromagnetic rays are reflected by said layer of metal on said non-metallic surface of the substrate to produce reflected electromagnetic rays;
   (d) receiving the scattered electromagnetic rays at an array of photodiodes; or receiving the said reflected electromagnetic rays at an array of photodiodes;
   (e) forming an image which comprises pixels,
      wherein each pixel in the image corresponds to a respective photodiode in said array, and
      wherein the colour of each pixel in said image corresponds to the intensity and/or frequency of the electromagnetic rays which photodiode corresponding to that pixel received; and
   (f) processing said formed image to determine the size of the particles,
   wherein the layer of metal comprises silver and the thickness of the layer of metal deposited on the non-metallic surface of the substrate and the thickness of the layer of metal deposited on said particles, is larger than said defined minimum size of particles whose size is to be determined.

2. A method according to claim 1,
   wherein step (c) comprises illuminating said layers of metal on said particles and said layer of metal on said non-metallic surface of the substrate with electromagnetic rays, so that said electromagnetic rays are scattered by layers of metal on said particles to produce respectively scattered electromagnetic rays,
   wherein step (d) comprises receiving the scattered electromagnetic rays at an array of photodiodes, and
   wherein the image is a dark field image and the colour of each pixel in said image corresponds to the intensity and/or frequency of the scattered light which photodiode corresponding to that pixel received.

3. A method according to claim 1 wherein step (a) comprises providing a substrate which has a non-metallic surface, wherein the non-metallic surface comprises at least one or more of, silicon, SiO2 (glass), quartz, gallium arsenide, Si3N4, TiO2, HfO2, ZnSe, ZnS, ZrO2, Nb2O5, LaTiO3, To2O5, LiF, MgF2, Na3 AlF6, a photoresist, a corrosion inhibitor layer or an adhesion promoter layer.

4. A method according to claim 1 wherein the layer of metal deposited on the non-metallic surface of the substrate and the layer of metal deposited on said particles, comprises at least one of: W, Co, Ag, Au, Al, Cu.

5. A method according to claim 1 wherein the non-metallic surface of the substrate is inorganic.

6. A method according to claim 1 wherein the non-metallic surface of the substrate is organic.

7. A method according to claim 1 wherein the step (b) comprises depositing a layer of metal on the non-metallic surface of the substrate and a layer of metal on said particles, at a deposition rate in the range 0.2 Angstroms/second-50 Angstroms/second.

8. A method according to claim 1 wherein the layer of metal deposited on the non-metallic surface of the substrate and the layer of metal deposited on said particles comprises silver (Ag); and the thickness of the layer of metal deposited on the non-metallic surface of the substrate and the thickness of the layer of metal deposited on said particles, is in the range 40 nm-70 nm; and the step (b) comprises depositing the layer of metal on the non-metallic surface of the substrate and the layer of metal on said particles, at a deposition rate in the range 0.8 Angstroms/second −5 Angstroms/second.

9. A method according to claim 1 wherein the electromagnetic rays have a wavelength in the range 180 nm-750 nm.

10. A method according to claim 1 wherein the step of processing said formed image to determine the size of the particles, comprises:
(i) inputting the image to a predefined model; wherein the predefined model defines different combinations of predefined image characteristics and a predefined particle size being associated with each of the different combinations of predefined image characteristics;
(ii) extracting characteristics from said image; and identifying a combination of predefined image characteristics which matches said extracted characteristics; and
(iii) outputting the predefined particle size which are associated with said identified combinations of predefined image characteristics which matched said extracted characteristics, wherein the outputted predefined particle size corresponds to the size of a particle which is shown in the image.

11. A method according to claim 10,
wherein, either, said image formed in step (e) is an image corresponding to only a part of the whole surface area of the substrate, and steps (i)-(iii) are repeated for each of a plurality of images until images for whole surface area of the substrate have been processed or until images for a selected portion of the surface area of the substrate have been processed; or,
wherein said image formed in step (e) is an single image corresponding to the whole surface area of the substrate, and steps (i)-(iii) are carried out a single time for said single image, or, said image formed in step (e) is an single image corresponding to a selected portion of the surface area of the substrate, and steps (i)-(iii) are carried out a single time for said single image.

12. A method according to claim 1 comprising using said formed image to estimate the location of a particle on said non-metallic surface.

13. A method according to claim 12 further comprising the steps of;
moving a Raman laser source to above the location of a particle;
illuminating the layer of metal at the location of the particle, with a Raman laser emitted by the Raman laser source, wherein said Raman laser is scattered by said layer of metal to produce scattered light, and wherein the scattered light comprises both Raman scattered light and also Rayleigh scattered light;
receiving said scattered light at an objective lens;
filtering out the Rayleigh scattered light from the from the received scattered light and passing only the Raman scattered light through said objective lens;
using an optical dispersion grating to disperse the Raman scattered light into different frequencies;
receiving the dispersed Raman scattered light into a linear photodiode having a plurality of pixels, wherein each pixel is associated with a predefined different light frequency;
determining a photon count per pixel, wherein the photon count per pixel corresponds to a light intensity for certain frequency;
plotting the acquired photon count per frequency to form a Raman spectra.

14. A method according to claim 13 further comprising the step of using the Raman spectra to characterize the material of the particles.

15. A method according to claim 1 wherein said deposited a layer of metal comprises grains of a plurality of different sizes; and wherein the average size of all the grains of the layer of metal is in the range 10 nm-100 nm.

16. A method according to claim 1 wherein physical vapor deposition is used to deposit said layer of metal on the non-metallic surface of the substrate and said particles, so that each of said particles is provided with a respective layer of metal and an area of the said non-metallic surface which is without particles is provided with a layer of metal, wherein, for each particle there is a gap between the layer of metal on that particle and the layer of metal on said metallic surface.

17. An assembly, which is operable to execute the method according to claim 1 comprising:
a station comprising means for depositing a layer of metal on said non-metallic surface and said particles on said non-metallic surface of the substrate, so that each of said particles is provided with a respective metallic layer and an area of the said non-metallic surface which is without particles is provided with a metallic layer, wherein, for each particle there is a gap between the metallic layer on the particle and the metallic layer on said non-metallic surface,
wherein the non-metallic surface of the substrate is inorganic and the thickness of the layer of metal deposited on the non-metallic inorganic surface of the substrate and the thickness of the layer of metal deposited on said particles is in the range 20 nm-80 nm, and
wherein the layer of metal comprises silver and the thickness of the layer of metal deposited on the non-metallic surface of the substrate and the thickness of the layer of metal deposited on said particles, is larger than a defined minimum size of particles whose size is to be determined;
a station comprising means for illuminating said layers of metal on said particles and metallic surface with electromagnetic rays, so that said electromagnetic rays are scattered by layers of metal on said particles to produce respectively scattered electromagnetic rays; or
illuminating said layers of metal on said particles and non-metallic surface with electromagnetic rays, so that at least a portion of said electromagnetic rays are absorbed by layers of metal on said particles and another portion of said electromagnetic rays are reflected by the metallic layer provided on the non-metallic surface on the substrate to produce reflected electromagnetic rays;

a station comprising an array of photodiodes which can receive the scattered electromagnetic rays at an array of photodiodes; or which can receive said reflected electromagnetic rays;

a station comprising means for forming an image which comprises pixels, wherein each pixel in the image corresponds to a respective photodiode in said array, wherein the colour of each pixel in said image corresponds to the intensity and/or frequency of the electromagnetic rays which photodiode corresponding to that pixel received; and a station comprising means for processing said formed image to determine the size of the particles.

\* \* \* \* \*